United States Patent [19]
Stolpp

[11] Patent Number: 5,794,924
[45] Date of Patent: Aug. 18, 1998

[54] PNEUMATIC OR HYDROPNEUMATIC SPRING SYSTEM

[75] Inventor: Dieter Stolpp, Aichwald, Germany

[73] Assignee: Mercedes-Benz AG, Germany

[21] Appl. No.: 794,518

[22] Filed: Feb. 3, 1997

[30] Foreign Application Priority Data

Feb. 1, 1996 [DE] Germany ............ 196 03 593.7

[51] Int. Cl.[6] ............................................. B60G 17/04
[52] U.S. Cl. ............................. 267/64.11; 267/64.25; 267/64.28; 280/707; 280/714
[58] Field of Search ................. 267/64.11, 64.28, 267/64.25, DIG. 1, DIG. 2; 701/37, 39; 280/707, 708, 711, 709, 714, 702, 840, 6.11, 6.12; 340/626; 188/322.21

[56] References Cited

U.S. PATENT DOCUMENTS

| | | | |
|---|---|---|---|
| 3,736,003 | 5/1973 | Ono | 280/711 |
| 4,659,104 | 4/1987 | Tanaka et al. | 280/714 |
| 4,700,303 | 10/1987 | Tokuyama et al. | 701/39 |
| 4,709,934 | 12/1987 | Suzuki et al. | 280/707 |
| 4,733,875 | 3/1988 | Azuma et al. | 280/707 X |
| 4,756,548 | 7/1988 | Kaltenthaler et al. | 280/711 |
| 4,886,291 | 12/1989 | Okamoto | 701/39 |
| 5,696,678 | 12/1997 | Raad et al. | 280/707 |

FOREIGN PATENT DOCUMENTS

| | | |
|---|---|---|
| 41 23 706 A1 | 1/1993 | Germany. |
| 41 29 610 A1 | 3/1993 | Germany. |

OTHER PUBLICATIONS

Multi–channel Measurement Device for Experiments with Thermic Turbo Machinery, Von Manfred Guse et al., Technisches Messen atm, 1976, Heft 11, pp. 337–340.

Primary Examiner—Douglas C. Butler
Attorney, Agent, or Firm—Evenson, McKeown, Edwards & Lenahan, P.L.L.C.

[57] ABSTRACT

A pneumatic or hydropneumatic spring system, especially for motor vehicles, has a plurality of separate spring units among which a valve-controlled pneumatic or hydraulic pipeline system is disposed. Thereby, the spring units can be connected to or disconnected from one another or connected to a pneumatic or hydraulic pressure source or to an outlet. The pipeline system also has a central in-and-out pipeline with a pressure sensor. The valves are so disposed that given or giveable system parts or system areas can be connected separately to the in-and-out line. A central in-and-out line is provided with a pressure sensor, and the valves are so arranged that given or giveable system parts can be connected separately to the in-and-out line and thus to the pressure sensor to determine pressure.

13 Claims, 5 Drawing Sheets

5,794,924

1

PNEUMATIC OR HYDROPNEUMATIC SPRING SYSTEM

BACKGROUND AND SUMMARY OF THE INVENTION

The present invention relates to a pneumatic or hydropneumatic spring system, especially for a motor vehicle, having a plurality of separate spring units between which a valve-controlled pneumatic or hydraulic pipeline system is disposed. The spring units can be connected to or disconnected from one another or connected to a pneumatic or hydraulic pressure source or drain. The pipeline system has a central in-and-out pipe with a pressure sensor, and the valves are so disposed that system parts or system areas can be connected separately to the in-and-out line.

A corresponding hydropneumatic spring system is described in German Patent 41 29 610 A1. Likewise, a spring system is shown in DE 41 23 706 A1, in which a high-pressure pipeline is provided with pressure reservoirs, and is connected to the discharge side of a pump by a check valve opening to the high-pressure side. A low-pressure pipeline connected permanently to a relatively pressure-free reservoir. The valves of the pipeline system are so arranged that the spring units can be connected in basically any combination to the high-pressure pipeline or the low-pressure pipeline. The possibility furthermore exists of connecting the spring units of one axle to one another, via a throttled line.

An article, "Messwerterfassungsanlage für Versuche an thermischen Turbomaschinen" in the periodical "Technisches Messen atm" (1976) vol. 11, pages 337 to 340, describes the connection of a pressure converter via a network of measuring lines that is switched by valves to any one of many points of measurement of a system to be monitored, i.e., a single pressure converter suffices for measuring pressure at many points of measurement.

An object of the present invention is to provide a new pneumatic or hydropneumatic spring system which offers novel control possibilities in addition to improved safety based on the general idea of providing optimum emergency programs for cases of leakage.

This object has been achieved in a spring system in accordance with the present invention by using the signals of the pressure sensor to monitor the system or its parts for leaks, shut off the supply of pneumatic or hydraulic medium to damaged spring units, and operate the rest of the spring units for the greatest possible stabilization of the vehicle.

If, for example, in a motor vehicle the spring units are normally operated such that the ground clearance remains approximately constant over an average time period, leakage will cause too much air or hydraulic fluid to be fed to one spring unit in order to compensate the reduction of the ground clearance of the vehicle caused by the leakage. In the case of severe leakage, however, this feeding of fluid is not practicable. In a hydropneumatic spring system, furthermore, the supply of the hydraulic medium would quickly be used up by severe leakage. It is an object of the present invention to prevent the occurrence of this problem while also adapting the rest of the working spring units to the particular need.

According to one currently preferred embodiment, provision can be made for operating shock dampers associated with the spring units in accordance with the pressure sensor's signals reflecting the pressure conditions at the spring units. On one hand, in normal operation the shock dampers can be operated according to the loading of the spring units,

2 and, on the other hand shock damper operation becomes possible taking the particular trouble into consideration within the scope of an emergency program.

An advantageous feature of the present invention is that the entire system can be monitored and optimally adapted to the particular circumstances with comparatively little mechanical expense, i.e., with a single pressure sensor. Also, use is made of the knowledge that, at least in the spring systems of motor vehicles, any necessary increases and decreases of pressure in parts of the system can take place always successively and thus via a single in-and-out line.

According to a particularly preferred embodiment of the present invention, the spring system has a central pressure reservoir which can be charged via the in-and-out line. The arrangement of the valves is advantageously made such that the connection between the in-and-out line and the pressure reservoir can be closed, while, when the connection is shut off, the in-and-out line can be connected to the spring units of a motor vehicle axle. The two axles can then be controlled virtually independently of one another.

BRIEF DESCRIPTION OF THE DRAWINGS

These and other objects, features and advantages will become more apparent from the following detailed description of the preferred embodiments when taken in conjunction with the accompanying drawings wherein.

DETAILED DESCRIPTION OF THE DRAWINGS

Figure 1:
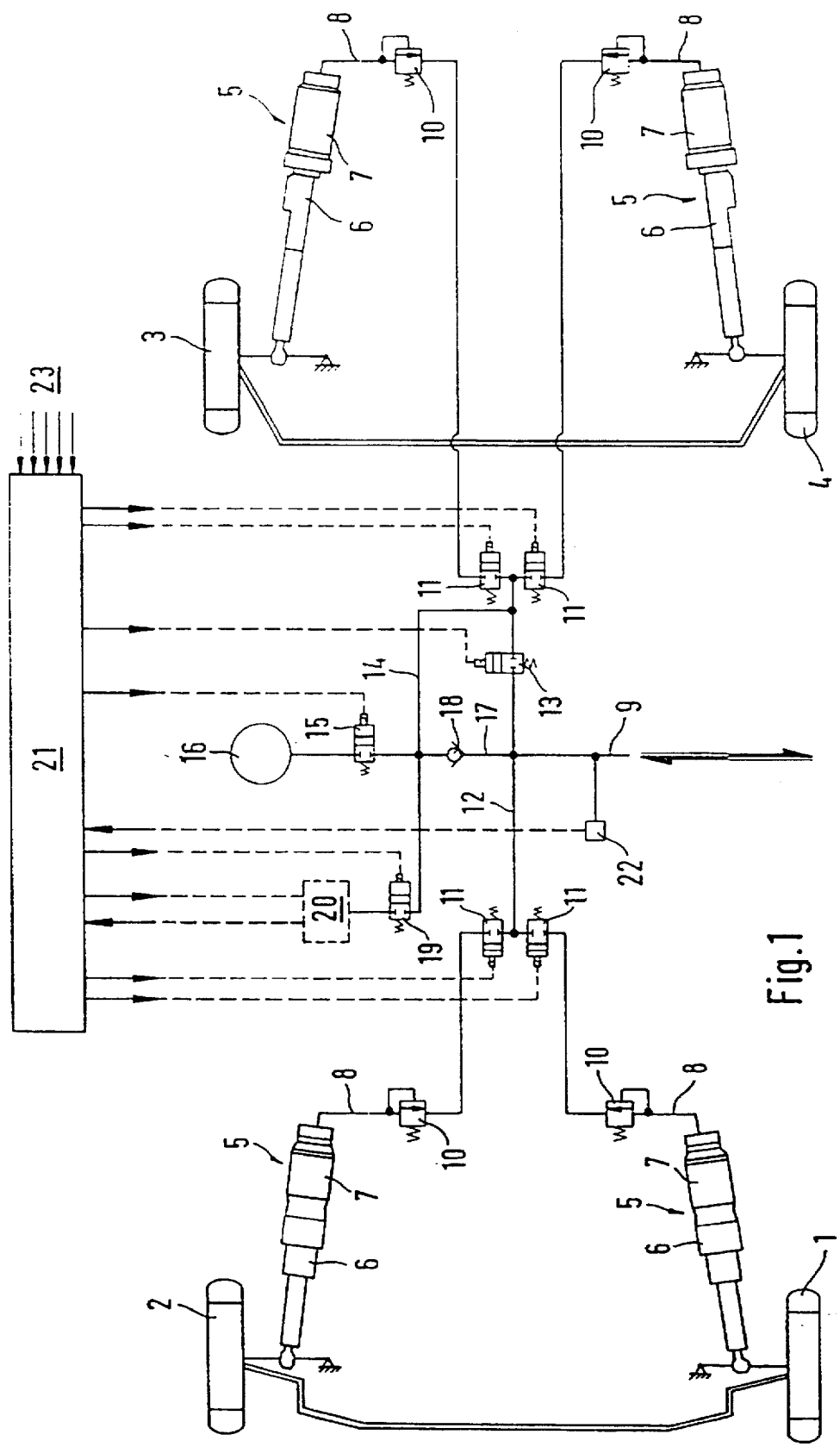
FIG. 1 is a schematic diagram of a first embodiment of the present invention.
Figure 2:
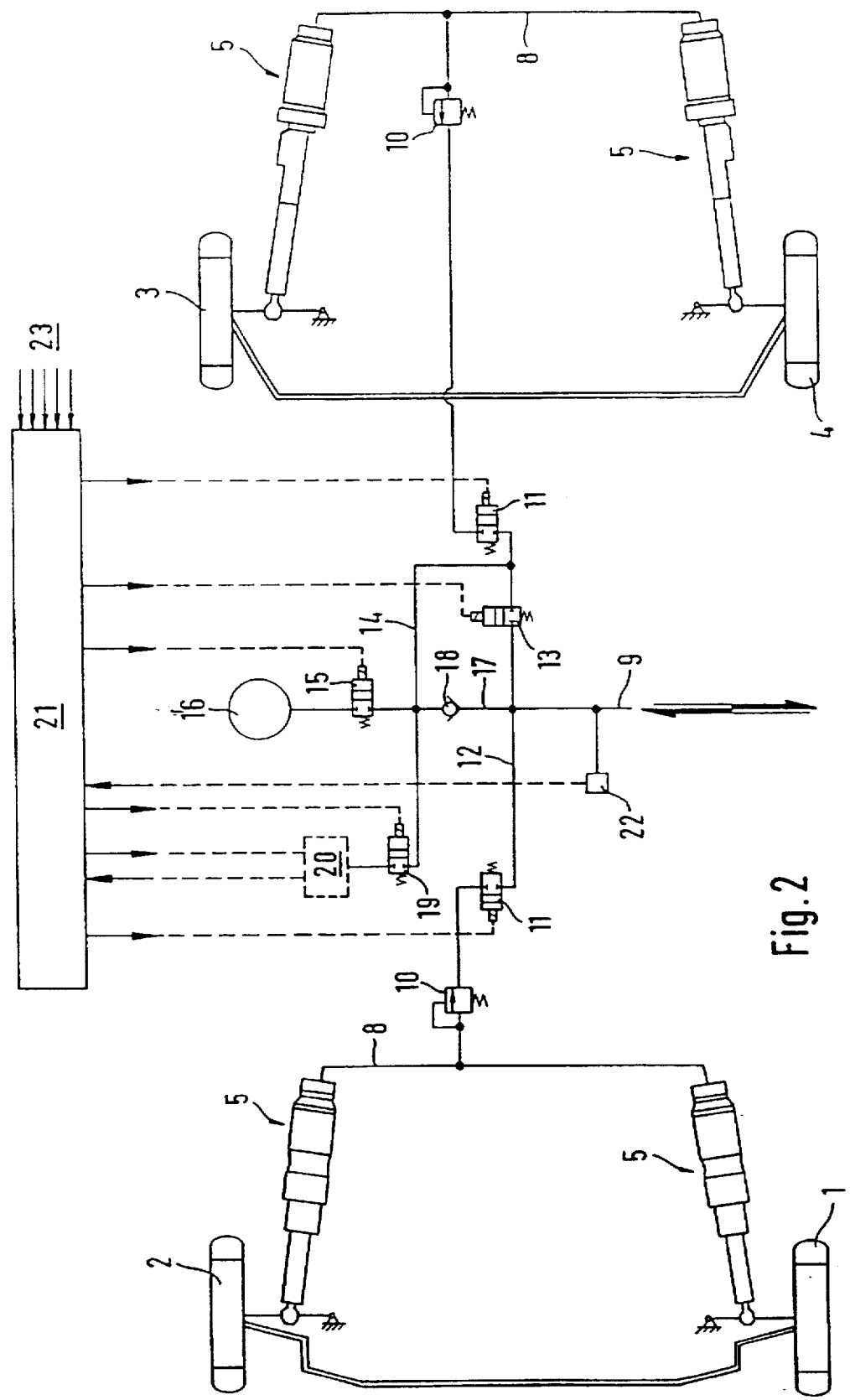
FIG. 2 is a corresponding diagram of a simplified embodiment of the present invention.
Figure 3:
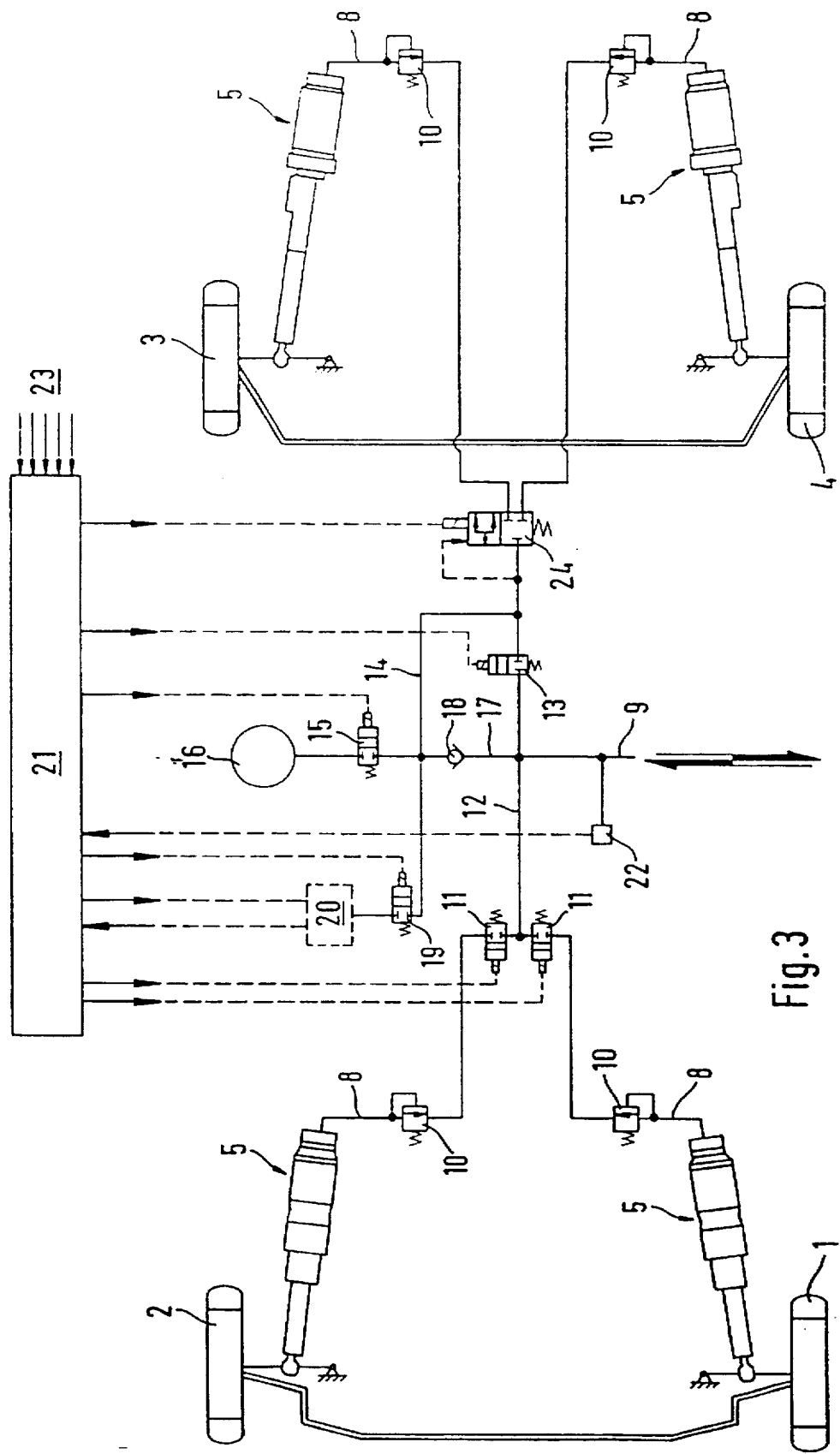
FIG. 3 is an additional modified embodiment of the present invention.

FIGS. 1–3 assume hydropneumatic spring systems, with lines 8, 12, 14 and 17 being hydraulic lines. According to FIG. 1, a motor vehicle has a front axle with wheels 1, 2 and a rear axle with wheels 3, 4. A hydropneumatic spring unit 5 is associated with each wheel and comprises essentially a combination of a hydraulic piston-and-cylinder unit 6 as well as a pneumatic spring reservoir 7 which communicates with the piston working space or spaces of the piston-and-cylinder unit 6 through a line, which is throttled or can be throttled and provides for the resilient support of a particular wheel 1 to 4.

Each spring unit 5 is connected by a line 8 to a hydraulic fluid in-and-out line 9 in the manner set forth below, so that the hydraulic fluid can be fed to each spring unit 5 to increase the ground clearance of the vehicle structure and carried away from each spring unit 5 to reduce the ground clearance.

An automatic shut-off valve 10 on each line 8 switches to its closed position as soon as the hydraulic pressure in the particular spring unit 5 drops below a set level. Otherwise the lines 8 can each be connected by a control valve 11 to a line 12 which is connected to the in-and-out line 9 and in which a control valve 13 is arranged so as to be associated with the wheels 3, 4. Between the control valve 13 and control valves 11 of wheels 3, 4, a line 14 is connected and leads through a control valve 15 to a pressure reservoir 16. A line 17 is connected parallel to line 14 to in-and-out line 9 and has a check valve 18 which prevents any flow in line 17 toward the in-and-out line 9. Lines 14, 17 are connected through a control valve 19 in the example of FIG. 1 to a known device 20 which can be configured, for example, as an actuator for a differential lock.

The control valves 11, 13, 15 and 19 are electrically actuated by a conventional controller 21 which receives its input end signals from a pressure sensor 22 associated with the in-and-out line 9, as well as signals from detectors 23 which are associated, for example, each to one of the wheels 1 to 4, and whose signals indicate the raised position of the associated wheel 1 to 4 relative to the vehicle structure. The controller 21 also receives signals from the device 20 so that the controller 21 also "knows" or is undated with the current state of the device 20.

Depending on whether the control valves 11, 13, 15 and 19 are open or closed, the in-and-out line 9 is connected to different spring units 5 and to the pressure reservoir 16 and/or the device 20. Thereby, hydraulic medium is fed to the above-mentioned units or can be carried away from these units. In this manner it is possible to vary the average distance of the wheels 1 to 4 from the vehicle structure, the state of charge of the pressure reservoir 16 and/or the pressure at the device 20.

With the control valve 14 closed, the in-and-out 9 can be, if desired, selectively connected to the spring units 5 of wheels 1, 2, and the spring units 5 of the wheels 3, 4 can be connected to the pressure reservoir 16 assuming that valves 11, 15 are open.

In all phases of operation, the pressure sensor 22 makes it possible to examine the hydraulic pressures in the parts of the system connected to the in-and-out lines. The controller 21 can store at least the last pressure measurements made in association with the particular parts of the system, so that the controller 21 "knows" the pressure conditions in the system and, according to predetermined criteria, can decide, for example, whether a part of the system is to be given additional hydraulic pressure by connecting it to the pressure reservoir 16 or by connecting it to the in-and-out line 9. Especially, the system parts can be inspected for error-free operation by the pressure sensor. In any inspection operations, it is possible to make sure that the system parts to be inspected have been rendered pressure-less.

In the embodiment of FIG. 1, a separate control valve 11 is associated with each spring unit 5, so that each spring unit 5 can be connected individually to the in-and-out line 9 or to the pressure reservoir 16. However, a control valve 11 can be associated with only one of the spring units 5 of an axle if the number of control valves is to be reduced.

According to FIG. 2, both of the spring units 5 of an axle can be connected to line 12 through a common control valve 11.

The system represented in FIG. 3 corresponds to the embodiment of FIG. 1 but now with regards the front axle with wheels 1, 2. That is, the important difference from the embodiment of FIG. 1 is that the control valves 11 associated in FIG. 1 with wheels 3, 4 are replaced by a control valve 24 which either connects the spring units 5 of wheels 3, 4 together to line 12 or cuts them off from one another and from line 12. The control valve 24 is so configured that it is permanently urged or biased by a valve spring to its closed position, but the force of the valve spring can be overcome by an electromagnet and/or by the hydraulic pressure in line 12. That is, valve 24 can be brought into its open position both by supplying current to the electromagnet and by corresponding pressure in line 12.

Figure 5:
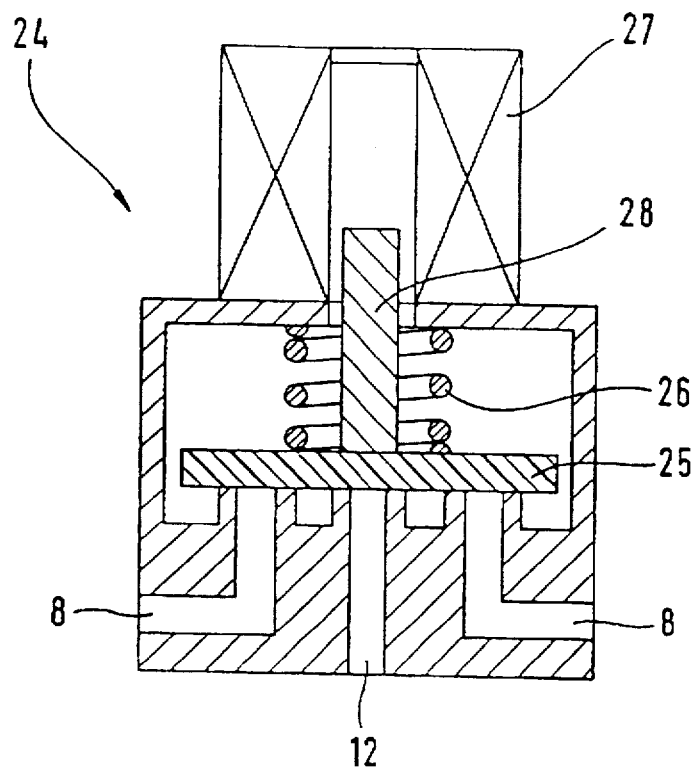
FIG. 5 is a schematic cross-sectional view of a valve used in the embodiment of FIG. 3.

An example of such a valve 24 is shown in FIG. 5. A valve plate 25 is forced by a spring 26 against its seat in the closed position in which the two lines 8 as well as line 12' are simultaneously shut off. By the pressure in line 12 and by energizing an electromagnet 27 which cooperates with an armature 28 on the valve plate 25, the valve plate 25 can be raised against the force of the valve spring 26 to its open position.

Figure 4:
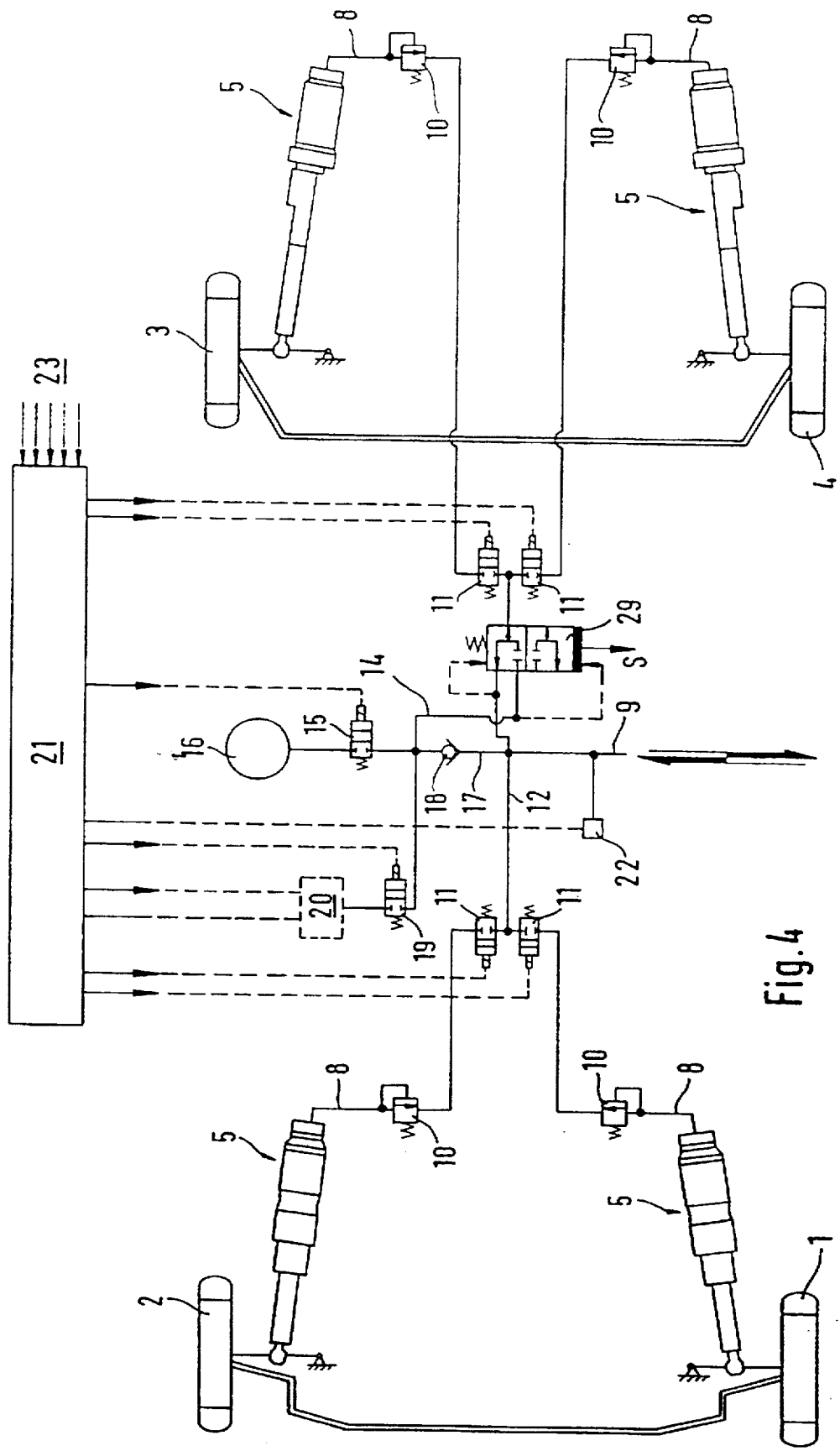
FIG. 4 is a still further modified embodiment of the present invention.

The system embodiment shown in FIG. 4 differs from the embodiment in FIG. 1 substantially in that the control valve 13 of FIG. 1 is replaced by a control valve 29 which connects either the in-and-out line 9 or the line 14 to the control valves 11 which connect the spring units 5 associated with the wheels 3 and 4. At the same time, the control valve 29 is configured such that it is urged by a spring as well as the pressure in the in-and-out line 9 to the position represented in FIG. 4 wherein the in-and-out line 9 is connected to the control valves 11 of the spring units 5 of wheels 3, 4. Moreover, valve 29 is also urged to this position by gravity represented by arrow S. The pressure in line 14 drives the control valve 29 to its other position, i.e., if the pressure in line 14 is great enough the control valve 29 switches to the other position.

Figure 6:
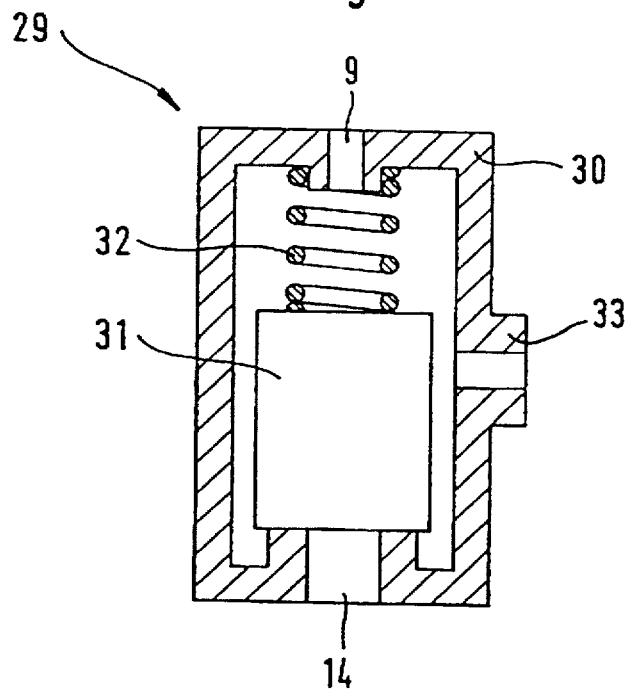
FIG. 6 is a schematic cross-sectional of a valve used in the embodiment of FIG. 4.

FIG. 6 shows one contemplated configuration for the control valve 29 of FIG. 4. A relatively heavy valve body 31 is disposed within a housing 30 and is urged by a valve spring 32, as well as gravity, against a seat at the mouth of line 14. Thereby, line 14 is closed as soon as the valve body 31 is on the above-mentioned seat. A housing connection for the in-and-out line 9 and a housing connection 33 leading to the control valves 11 of spring units 5 of wheels 3, 4 are thus joined together. When sufficient pressure is present in line 14, the valve body 31 is raised from the position shown and pressed against a seat at the mouth of line 9, so that the in-and-out line 9 is blocked and a connection between the housing connection 33 and the connection of line 14 is opened. As soon as the pressure in line 14 drops sufficiently, the valve body 31 resumes the position illustrated in FIG. 6.

The present invention is also applicable to purely pneumatic spring systems, in which case lines 8, 12, 14 and 17 are pneumatic pressure lines. Moreover, the signals of the pressure sensor 22, which according to the present invention can be connected like the in-and-out line to different system areas, offer the advantage of learning pressure conditions in various system parts, e.g., also in the individual spring units 5. In this manner, any controllable shock dampers on the vehicle wheels 1 to 4 can be controlled in relation to pressure. Because the pressure is a magnitude analogous to the load, a load-related control of the shock dampers is thus performed simultaneously.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A pneumatic or hydropneumatic spring system useable for a motor vehicle, comprising a plurality of separate spring units, a valve-controlled pneumatic or hydraulic line system disposed between the spring units so as to selectively connect and cut-off the spring units to and from one another or to be selectively connected with one of a pneumatic pressure source, a hydraulic pressure source and an outlet, wherein the line system has a central in-and-out line with a pressure sensor operatively arranged therein and valves of the line system being so arranged that at least one of system parts and system areas can be connected separately with the in-and-out line, and signals of the pressure sensor are utilized to monitor integrity of the system and of constituent parts thereof and to cut off any damaged ones of the spring units from the feed of pneumatic or hydraulic medium so that the other ones of the spring units are utilized to stabilize the motor vehicle.

2. The spring system according to claim 1, wherein shock dampers associated with the spring units are configured to be controlled in accordance with the signals of the pressure sensor reflecting pressure conditions at the spring units.

3. The spring system according to claim 2, wherein the in-and-out line is connectable to a pressure reservoir.

4. The spring system according to claim 3, wherein a signal coupled with one of a vehicle spring mass weight and vehicle load is derived from the signals of the pressure sensor to control one of dampers associated with the spring units and damping characteristic of the spring units.

5. The spring system according to claim 1, wherein the in-and-out line is connectable to a pressure reservoir.

6. The spring system according to claim 5, wherein shock dampers associated with the spring units are configured to be controlled in accordance with the signals of the pressure sensor reflecting pressure conditions at the spring units.

7. The spring system according to claim 1, wherein means is provided for feeding one of a pneumatic and hydraulic medium to the spring units to maintain a predetermined average lift position or for removing the medium from the spring units.

8. The spring system according to claim 1, wherein a signal coupled with a vehicle spring mass weight or vehicle load is derived from the signals of the pressure sensor to control one of dampers associated with the spring units and damping characteristic of the spring units.

9. The spring system according to claim 8, wherein shock dampers associated with the spring units are configured to be controlled in accordance with the signals of the pressure sensor reflecting pressure conditions at the spring units.

10. The spring system according to claim 1, wherein a pressure reservoir is operatively associated with the pressure sensor so that a state of charge of the pressure reservoir is ascertainable by the pressure sensor.

11. The spring system according to claim 10, wherein the in-and-out line is connectable with the pressure reservoir.

12. The spring system according to claim 11, wherein means is provided for feeding one of a pneumatic and hydraulic medium to the spring units to maintain a predetermined average lift position or for removing the medium from the spring units.

13. The spring system according to claim 12, wherein a pressure reservoir is operatively associated with the pressure sensor so that a state of charge of the pressure reservoir is ascertainable by the pressure sensor.

* * * * *